(12) United States Patent
Choi et al.

(10) Patent No.: US 10,147,213 B2
(45) Date of Patent: Dec. 4, 2018

(54) APPARATUS FOR GENERATING MOTION EFFECTS AND COMPUTER READABLE MEDIUM FOR THE SAME

(71) Applicant: POSTECH ACADEMY-INDUSTRY FOUNDATION, Gyeongsangbuk-do (KR)

(72) Inventors: Seung Moon Choi, Gyeongsangbuk-do (KR); Jae Bong Lee, Gyeongsangbuk-do (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 165 days.

(21) Appl. No.: 14/962,055

(22) Filed: Dec. 8, 2015

(65) Prior Publication Data

US 2016/0171713 A1 Jun. 16, 2016

(30) Foreign Application Priority Data

Dec. 11, 2014 (KR) .................. 10-2014-0178616

(51) Int. Cl.
   *G06K 9/00* (2006.01)
   *G06T 11/60* (2006.01)
   *G06T 13/80* (2011.01)

(52) U.S. Cl.
   CPC .............. *G06T 11/60* (2013.01); *G06T 13/80* (2013.01)

(58) Field of Classification Search
   CPC .................................. G06T 11/60; G06T 13/80
   See application file for complete search history.

(56) References Cited

FOREIGN PATENT DOCUMENTS

| KR | 100829564 B1 | 5/2008 |
|---|---|---|
| KR | 1020110043457 A | 4/2011 |
| KR | 1020120052783 A | 5/2012 |
| KR | 101212316 B1 | 12/2012 |

(Continued)

OTHER PUBLICATIONS

Jafari, Omid Hosseini, Dennis Mitzel, and Bastian Leibe. "Real-time RGB-D based people detection and tracking for mobile robots and head-worn cameras." Robotics and Automation (ICRA), 2014 IEEE International Conference on. IEEE, 2014.*

(Continued)

*Primary Examiner* — Nirav G Patel
(74) *Attorney, Agent, or Firm* — Ladas & Parry LLP

(57) ABSTRACT

Disclosed are motion effect generation apparatuses and a computer-readable recording medium for program codes for implementing the motion effect generation apparatuses. The apparatus for generating a motion effect may comprise a segment generation part configured to divide a moving path of a camera or an object obtained from raw motion information into a plurality of segments; a scaling part configured to adjust a size of each of the plurality of segments according to a driving range of a motion apparatus; and a merging part configured to generate a motion path of the motion apparatus by merging the plurality of segments sizes of which are adjusted. Therefore, time and costs for producing 4D movies to which motion effects are applied can be reduced. In addition, they can be easily applied to 4D movie theaters, 4D rides, home theater equipment, and home game machines.

7 Claims, 4 Drawing Sheets

(56) References Cited

FOREIGN PATENT DOCUMENTS

| KR | 1020130005899 A | 1/2013 |
| KR | 1020130067639 A | 6/2013 |
| KR | 1020130122704 A | 11/2013 |

OTHER PUBLICATIONS

Mitzel, Dennis, and Bastian Leibe. "Close-range human detection for head-mounted cameras." British Machine Vision Conference (BMVC). 2012.*

Byounghyun Yoo, et al; "A framework for a multi-sensory VR effect system with motional display", Published in International Conference on Cyberworlds, Nov. 23-25, 2005, 8 pages.

\* cited by examiner (a) Passing through a wooden fence
(b) Colliding against a wall

APPARATUS FOR GENERATING MOTION EFFECTS AND COMPUTER READABLE MEDIUM FOR THE SAME

CROSS-REFERENCE TO RELATED APPLICATIONS

This application claims priority to Korean Patent Application No. 10-2014-0178616 filed on Dec. 11, 2014 in the Korean Intellectual Property Office (KIPO), the entire contents of which are hereby incorporated by reference.

BACKGROUND

1. Technical Field

The present invention relates to an apparatus for generating motion effects, and more particularly to apparatuses for generating motion effects based on motion information or event information, and a computer-readable medium recording program codes implementing the same.

2. Related Art

Usually, motion effects may mean techniques for reproducing realistic experiences, which can provide users with motions or shocks according to music or movies whereby the users can enjoy the content head and ears. As examples of the content to which the motion effects are applied, there may be three-dimensional (3D) or four-dimensional (4D) movies which can give feeling of immersion by providing various physical atmospheres such as motion of chairs, vibrations, winds, and scents in addition to simple images and sounds. Also, among the various motion effects, motion effects which produce atmosphere of video in reality by giving motions to chairs according to the video being played act the most important role in the 4D movies.

In order to generate such the motion effects, a professional producer should generate the motion effects one by one. Therefore, it takes much time and costs to produce the content to which the motion effects are applied.

SUMMARY

Accordingly, exemplary embodiments of the present disclosure provide apparatuses for automatically generating optimal motion effects based on motion information prepared in advance or event information detected by sensors, and a computer-readable medium in which program codes used for implementing the apparatuses are recorded.

In order to achieve the objectives of the present disclosure, an apparatus for generating a motion effect may be provided. The apparatus for generating a motion effect may comprise a segment generation part configured to divide a moving path of a camera or an object obtained from raw motion information into a plurality of segments; a scaling part configured to adjust a size of each of the plurality of segments according to a driving range of a motion apparatus; and a merging part configured to generate a motion path of the motion apparatus by merging the plurality of segments sizes of which are adjusted.

Here, the apparatus may further comprise, when the raw motion information includes velocity change information or acceleration change information, an integration part configured to transform the velocity change information or the acceleration change information into time-dependent position change information.

Here, the scaling part may compute a sphere having a minimum size including the plurality of segments, and scale each of the plurality of segments in reference to the sphere according to the motion range of the motion apparatus. Also, the scaling part may cut parts of the plurality of segments locating outside of the sphere, and move the cut parts into the sphere.

Here, the merging part may generate a continuous motion path of the motion apparatus by concatenating segments which are temporally adjacent among the plurality of segments, and connecting an end point and a start point of the concatenated segments to a center position or a reference position of the motion range of the motion apparatus. Also, the apparatus may further comprise a segment adding part concatenating the segments which are temporally adjacent among the plurality of segments by generating an additional motion effect when a break exists between the segments which are temporally adjacent. Also, the segment adding part may generate the additional motion effect connecting an end point of a first segment to a start point of a second segment with a straight line, wherein the first segment and the second segment are temporally adjacent, the break exists between the first segment and the second segment, and the first segment precedes the second segments.

Here, the apparatus may further comprise a resampling part re-inputting the motion path of the motion apparatus to the segment generation part as the first motion information, when a sustainment time of the motion path of the motion apparatus is longer than a sustainment time of the moving path of the camera or the object.

Here, at least one of the segment generation part, the scaling part, and the merging part may be implemented as a removable module which is installed in the motion apparatus.

Here, the apparatus may further comprise a sustainment time calculation part calculating a first sustainment time of a detected event information when the detected event information has a sustainment time equal to or shorter than a second reference time shorter than a second sustainment time of the raw motion information; a comparison part comparing the first sustainment time of the detected event information with a first reference time shorter than the second reference time; and a temporary motion effect generation part outputting a first control signal for a temporary motion effect when the first sustainment time is shorter than the first reference time. Also, the apparatus may further comprise an irregular continuous motion effect generation part outputting a second control signal for an irregular continuous motion effect when the first sustainment time is equal to or longer than the first reference time and equal to or shorter than the second reference time.

In order to achieve the objectives of the present disclosure, an apparatus for generating a motion effect may be provided. The apparatus may comprise a sustainment time calculating part calculating a sustainment time of an event among inputted signals; a comparison part comparing the sustainment time of the event with a predetermined reference time; a temporary motion effect generation part outputting a first control signal for a temporary motion effect when the sustainment time is shorter than the predetermined reference time; and an irregular continuous motion effect generation part outputting a second control signal for an irregular continuous motion effect when the sustainment time is equal to or longer than the predetermined reference time.

Here, the first control signal may include first control information for driving the motion apparatus to a specific direction by a half cycle of a sine wave, and the second control signal may include second control information for driving the motion apparatus irregularly and continuously to generate irregular shocks and vibrations. Also, the second control information may include Perlin noises according to the event.

Here, the apparatus may further comprise a motion information processing module receiving and processing raw motion information having a longer sustainment time than a predetermined maximum sustainment time with respect to the event. In addition, the motion information processing module may include a segment generation part configured to divide a moving path of a camera or an object obtained from the raw motion information into a plurality of segments; a scaling part configured to adjust a size of each of the plurality of segments according to a motion range of a motion apparatus; and a merging part configured to generate a motion path of the motion apparatus by merging the plurality of segments sizes of which are adjusted.

Also, the apparatus may further comprise at least one of a memory device, an input/output device, and a communication device. The at least one of the memory device, the input/output device, and the communication device may provide the event information or the raw motion information to the sustainment time calculating part.

In order to achieve the objectives of the present disclosure, a computer-readable medium may be provided. In the computer-readable medium may store program codes executed by a computer system comprising a memory system for storing the program codes and a processor being connected to the memory system and executing the program codes. The computer system may be used for a motion effect generation apparatus and the program codes may have a first motion effect mode in which a sustainment time of an event detected in an inputted signal is calculated, the sustainment time of the event is compared with a predetermined reference time, a first signal for a temporary motion effect is outputted when the sustainment time of the event is shorter than the predetermined reference time, and a second signal for an irregular continuous motion effect is outputted when the sustainment time of the event is equal to or longer than the predetermined reference time; and a second motion effect mode in which a moving path of a camera or an object included in motion information detected in the inputted signal is divided into a plurality of segments, a size of each of the plurality of segments is adjusted according to a motion range of a motion apparatus, and a motion path of the motion apparatus is generated by merging the plurality of segments sizes of which are adjusted. Also, the first motion effect mode or the second motion effect mode may be performed by the processor selectively or simultaneously.

Here, the first control signal may include first control information for driving the motion apparatus to a specific direction by a half cycle of a sine wave, or the second control signal may include second control information for driving the motion apparatus irregularly and continuously to generate irregular shocks and vibrations. Also, the second control signal may include Perlin noises or a signal for generating Perlin noises.

According to the exemplary embodiments of the present disclosure, motion effect generation apparatuses for automatically generating optimal motion effects suitable to inputted motion information or detected event information, and a computer-readable recording medium on which program codes for implementing the apparatuses are recorded are provided. That is, the motion effects generated by the motion effect generation apparatus can provide feeling of realism similar to that made manually by a professional producer, whereby time and costs needed for producing motion effects can be considerably reduced.

Also, the motion effect generation apparatus according to the present disclosure may be utilized as a movie making tool so that time and costs for producing 4D movies to which motion effects are applied can be reduced. In addition, since it can generate motion effects for given motion information or event information in real time, it can be easily applied to 4D movie theaters, 4D rides, home theater equipment, and home game machines.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
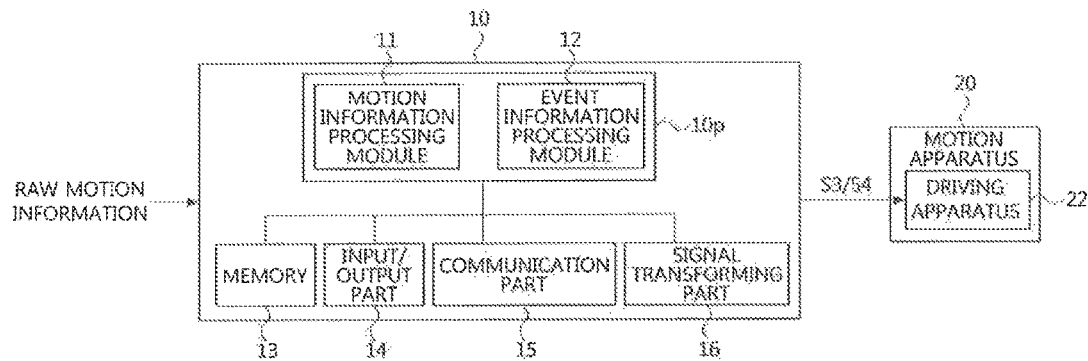
FIG. 1 is a block diagram of a system for generating and utilizing motion effects to explain a motion effect generation apparatus according to an exemplary embodiment of the present disclosure.

While the invention is susceptible to various modifications and alternative forms, specific embodiments thereof are shown by way of example in the drawings and will herein be described in detail. However, it should be understood that the present invention is not limited to these embodiments, and may include any and all modification, variations, equivalents, substitutions and the like within the spirit and scope thereof. Like reference numerals refer to like elements throughout.

Relational terms such as first, second, and the like may be used for describing various elements, but the elements should not be limited by the terms. These terms are only used to distinguish one element from another. For example, a first component may be called a second component, and a second component may also be called a first component without departing from the scope of the present invention. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The terms used in the present specification are set forth to explain the embodiments of the present invention, and the scope of the present invention is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

FIG. 1 is a block diagram of a system for generating and utilizing motion effects to explain a motion effect generation apparatus according to an exemplary embodiment of the present disclosure.

Referring to FIG. 1, a motion effect generation apparatus 10 according to an exemplary embodiment may be connected to a driving apparatus 22 of a motion apparatus 20, and operate in order to effectively drive the motion apparatus 20 within a maximum motion range of the motion apparatus 20 by transmitting motion information transformed suitably to the motion apparatus 20 or control signals S3 or S4 for such the motion information to the driving apparatus 22.

For this, the motion effect generation apparatus 10 may comprise a processor 10$p$ and a memory 13. Here, the processor 10$p$ may comprise one of a motion information processing module 11 and an event information processing module 12, or both of the two modules.

Also, the motion effect generation apparatus 10 may be implemented as modules including the motion information processing module 11, the event information processing module 12, or both of the two modules. Also, it may be installed as connected to an input port or a communication interface of the motion apparatus 20 or the driving apparatus 22 of the motion apparatus 20.

Also, the motion effect generation apparatus 10 may be implemented as further comprising an input/output part 14 and a communication part 15 in addition to the processor 10$p$ and the memory 13, or as a computer system comprising all of them, according to various exemplary embodiments. Here, the computer system may be a desktop computer, a tablet computer, a personal digital assistance (PDA), or a smart phone which includes a microprocessor, an application processor, or any other type of processor capable of performing similar functions.

Specifically, the processor 10$p$ may be configured to execute program codes stored in the memory 13, and transform motion information inputted through the input/output part 14 or motion information inputted through the communication part 15, thereby generating motion information adjusted suitably to the motion apparatus or signals controlling the driving apparatus to drive the motion apparatus in order generate a desired motion effect.

The processor 10$p$ may comprise an arithmetic logic unit (ALU) performing computations, registers for storing data and instructions, and a controller controlling or managing interfaces between middleware. Also, the processor 10$p$ may store one or both of the motion information processing module and the event information processing module in the memory, and output motion information suitable to the motion apparatus by transforming inputted motion information which is raw data through operations of respective modules or interoperation between the modules. That is, the processor 10$p$ may output signals or control information for generating effective motion effects of the motion apparatus.

The processor 10$p$ may have one of various architectures such as Alpha of Digital corporation, MIPS of MIPS technology corporation, NEC corporation, IDT corporation, or Siemens corporation, x86 of Intel, Cyrix, A M D, and Nexgen, and PowerPC of IBM and Motorola.

The motion information processing module 11 and the event information processing module 12 will be explained in detail.

The memory system 13 may include a main memory such as a Random Access Memory (RAM) and a Read-Only Memory (ROM), and a secondary memory which is a long-term storage medium such as a Floppy disc, hard disc, tape, CD-ROM, and Flash memory. The memory system 13 may include a recording medium on which program codes for executing methods for generating motion effects according to exemplary embodiments of the present disclosure are recorded. Also, the memory system 13 may store motion information (i.e., raw data).

The input/output part 14 may be connected to a middleware of other type device, and include a user interface. The input/output part 14 may comprise at least one of various devices such as an input port, an output port, a keyboard, a mouse, a display apparatus, and a touch panel. The input port may be connected to a drive apparatus of a recording medium, and be configured to receive motion information or program codes stored in the recording medium. Here, the keyboard or mouse may include a physical transducer such as a touch screen or a microphone. Also, the input/output part 14 may include a video graphic board for proving graphical images used for inputting or responding to queries or for managing the apparatus.

The communication part 15 may be connected with another communication apparatus via a network. Also, the communication part 15 may receive program codes implementing methods for generating motion effects through the network in real time. The communication part 15, as a network interface performing communications with the middleware or the user interface, may include a wire communication interface or a wireless communication interface. In some exemplary embodiments, the communication part 15 may act as means or a component receiving program codes or motion information from a server or a storage system on the network.

Also, the motion effect generation apparatus 10 according to an exemplary embodiment may further include a signal transforming part 16 which generates a motion effect suitable to the motion apparatus 20 by processing motion information which is stored in the memory system 13 or inputted through the input/output part 14 or the communication part 15, and transforms a signal or information for the motion effect into a signal (refer to S3 or S4) identifiable to the motion apparatus 20 or the driving apparatus 22 of the motion apparatus 20.

Here, the signal identifiable to the motion apparatus 20 or the driving apparatus 22 may be a signal which includes information on the motion effect transformed suitably to the motion apparatus 20 and can be applied to the driving apparatus 22. Also, the signal may include a first control signal S3 for motion information (hereinafter, referred to as 'event information') having a sustainment time shorter than a predetermined time and a second control signal S4 for motion information having a sustainment time equal to or longer than the predetermined time.

Meanwhile, although the signal transforming part 16 is explained as being included in the motion effect generation apparatus 10, various exemplary embodiments may not be restricted thereto. For example, the signal transforming part 16 may be connected to an input end of the motion apparatus 20 through which signals or control information are inputted. Also, the signal transforming part 16 may be connected to an output end of the motion effect generation apparatus 10 or an input end of the driving apparatus 22. Also, the signal transforming part 16 may be installed in an arbitrary entity which can access the communication network. Here, the arbitrary point may indicate at least one functional or constituent part of a server or a cloud system on internet or the wire/wireless communication network.

As an apparatus for realizing motion effects, the motion apparatus 20 may include a motion chair for a 4D movie theater, 4D rides, home theater equipment, home game machines, etc. That is, the motion apparatus 20 may be an apparatus configured to receive optimal motion information from the motion effect generation apparatus 10 or a computer system in which the apparatus is implemented, and provide a motion effect according to the received optimal motion information. In other words, the motion effect generation apparatus 10 may receive various types of raw motion information including a moving path of an interest object such as a camera or an object body, and provide the optimal motion information based on the raw motion information to the motion apparatus 20.

The driving apparatus 22 may include means which is installed in the motion apparatus 20 and drives the motion apparatus 20 to output the motion effects according to signals or control information from the motion effect generation apparatus 10, or a constituent part performing operations corresponding to those of the means. For example, the driving apparatus 22 may include at least one of a motor, a hydraulic pump, a pneumatic pump, etc.

According to exemplary embodiments of the present disclosure, the motion effect generation apparatus may be installed in a computer system having a processor, a memory system, an input/output part, and a communication part, or program codes for implementing the motion effect generation method may be stored and executed by a computer system whereby signals or control information for generating motion effects can be efficiently provided to the motion apparatus connected to the computer system.

Hereinafter, structures and operations of the above-described motion information processing module 11 and the event information processing module 12 will be explained in detail.

Figure 2:
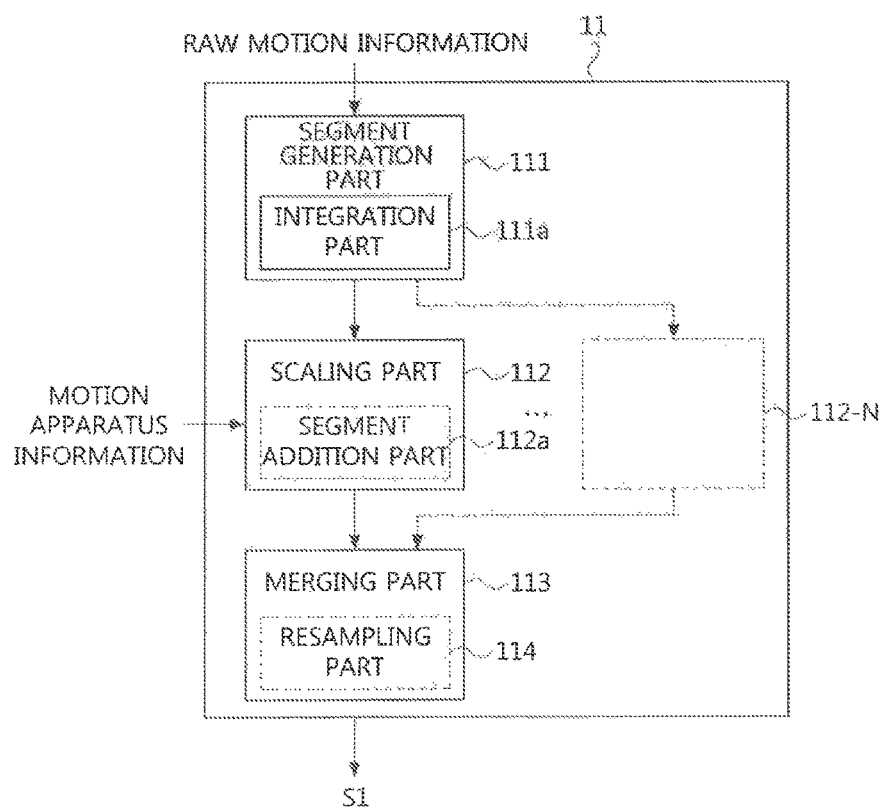
FIG. 2 is a block diagram of the motion information processing module of the motion effect generation apparatus of FIG. 1.

FIG. 2 is a block diagram of the motion information processing module of the motion effect generation apparatus of FIG. 1.

Referring to FIG. 2, the motion information processing module 11 according to an exemplary embodiment may comprise a segment generation part 111, a scaling part 112, and a merging part 113. Also, through operations of the above constituent parts, the motion information processing module 11 may output a signal or control information S1 for the motion information transformed suitably to a maximum motion range of the motion apparatus from raw motion information based on information of the motion apparatus.

More specifically, the segment generation part 111 may be configured to divide a moving path of a camera or an object included in the raw motion information, which have been extracted from a video, etc. and provided to the motion effect generation apparatus, into a plurality of segments. In this case, the segment generation part 111 may divide the moving path into a plurality of segments on the basis of a maximum motion range of the motion apparatus.

The scaling part 112 may be configured to adjust a size of each of the plurality of segments according to the motion range of the motion apparatus. According to an exemplary embodiment, the scaling part 112 may compute a sphere of a minimum size including the plurality of segments, and scale each of the plurality of segments in reference to the computed sphere according to the motion range of the motion apparatus. Also, the scaling part 112 may perform the scaling procedure in the manner of cutting a first part of a moving path locating outside of the sphere, moving the first part into the sphere (toward the center position of the sphere, i.e., to the direction perpendicular to the surface of the sphere), cutting again a second part of the moving path locating outside of the sphere, and moving again the second part into the sphere. Also, the scaling part 112 may be implemented as multiple entities, for example, scaling parts 112-1, . . . , and 112-N, in order to transform the plurality of segments divided in the segment generation part 111 in real time.

Information on the motion apparatus, such as the motion range of the motion apparatus, may be stored in a storage which can be accessed by the motion effect generation apparatus or the motion information processing module 11 in a predetermined format, or inputted or received from an external. Here, the storage may be the memory system 13 in FIG. 1, and the predetermined format may include a look-up table in which information on the maximum motion range of the motion apparatus is recorded as corresponding to a serial number or an identification number of the motion apparatus.

The maximum motion range may indicate a maximum range to which the motion apparatus can be driven. However, various exemplary embodiments may not be restricted thereto. For example, the maximum motion range may indicate a maximum value among values representing motion strength levels classified into 'strong', 'medium', and 'weak', or classified into 5 levels.

The merging part 113 may be configured to generate a motion path of the motion apparatus by merging the plurality of segments sizes of which are adjusted according to a motion capability (e.g., the maximum motion range) of the motion apparatus. That is, the merging part 113 may generate a continuous motion path of the motion apparatus by concatenating temporally-adjacent segments among the plurality of segments and connecting an end point and a start point of the concatenated segments to a center position or a reference position of the motion range of the motion apparatus. The continuous motion path may have a shape of one or more closed curves including the center position or the reference position.

With respect to the operations of the merging part 113, the motion information processing module 11 may generate and use an additional motion effect for concatenating the segments which are temporally adjacent among the plurality of segments when a break exists between the segments which are temporally adjacent. For this, the motion effect processing module 11 may further include a segment adding part 113a.

For example, the segment adding part 113a may generate the additional motion effect connecting an end point of a first segment to a start point of a second segment with a straight line, when the first segment and the second segment are temporally adjacent, the break exists between the first segment and the second segment, and the first segment precedes the second segments. The segment adding part 113a may be included in the merging part 113 as a functional part or a constituent part of the merging part 113. However, various exemplary embodiments may not be restricted thereto.

The motion information including the motion path generated by the merging part 113 may be directly outputted by the motion information processing module. The motion information may be outputted as a signal or control information or as included in a signal or control information.

On the other hand, when a sustainment time of the motion path generated by the merging part 113 is different from a sustainment time of a moving path included the raw motion information inputted to the motion information processing module 11, the motion information processing module 11 may be configured to re-input the motion path generated by the merging part 113 to the segment generation part 111 as raw motion information including a new moving path of the camera or the object.

In the above-described case, the motion information processing module 11 may further include a resampling part 114 which is connected to the output end of the merging part 112, compares the sustainment time of the motion path with the sustainment of the moving path, and inputs the new raw motion information including the motion path as a new moving path according to the comparison result. The resampling part 114 may operate to make the segment generation part 111, the scaling part 112, and the merging part 113 process the raw motion information repeatedly one or more times in a recursive manner.

Although the resampling part 114 is connected to the output end of the merging part 113 in the above exemplary embodiment, the resampling part 114 may be connected to a functional part of the merging part 114, or may be implemented as included in the merging part 113. In such the case, the resampling part 114 may directly output the moving path generated by the merging part or feedback it to the segment generation part 111 according to a result of comparison between the sustainment time of the motion path and the sustainment time of the moving path.

Meanwhile, in the above-described exemplary embodiment, the motion information processing module 11 may further include an integration part 111a. The integration part 111a may be a functional component which integrates velocity change information or acceleration change information of the raw motion information to obtain time-dependent position change information for the camera or the object when the raw motion information includes the velocity change information or the acceleration change information.

Although the integration part 111a may be included in the segment generation part 111 as a functional part or a constituent part, various exemplary embodiments may not be restricted thereto. For example, the integration part 111a may be connected to the input end of the segment generation part 111 thereby transforming the raw motion information into the motion information which can be processed by the segment generation part 111. In addition, the integration part 111a may be substituted with a functional part or a constituent part which can transform the raw motion information having a structure or a format which cannot be processed directly by the segment generation part III into a structure of a format which can be processed by the segment generation part 111.

Figure 3:
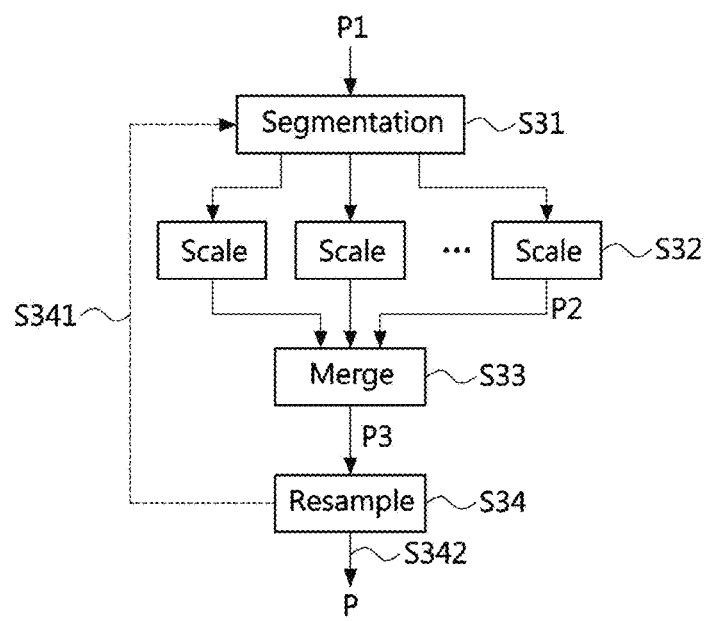
FIG. 3 is a flow chart illustrating an operation procedure of the motion information processing module of FIG. 2.

FIG. 3 is a flow chart illustrating an operation procedure of the motion information processing module of FIG. 2.

Referring to FIG. 3, in a segmentation step S31, the motion information processing module according to an exemplary embodiment may generate a plurality of segments by dividing a moving path P1 of raw motion information through the segment generation part 111.

Then, in a scaling step S32, the at least one scaling part may adjust a size of each of the plurality of segments according to a maximum motion range or a predetermined motion range of the motion apparatus. In this instance, the motion path P1 included in the raw motion information may be transformed into a plurality of sub moving path P2 including the plurality of segment sizes of which are adjusted.

Then, in a merging step S33, the merging part may generate a continuous motion path P3 of the motion apparatus by merging the plurality of segments sizes of which are adjusted. In the merging step, at least one auxiliary segment may be added to the plurality of segments sizes of which are adjusted in order to fill breaks existing between motion effects. The at least one auxiliary segment may include additional motion effect information (hereinafter, referred to as 'additional motion information') for remedying breaks between segments, and the additional motion information may include additional motion paths for fill breaks between the moving paths.

In a resampling step S34, the resampling part may compare the sustainment time of the motion path P3 with the sustainment time of the moving path P1. According to the comparison result, when a third sustainment time of the motion path P3 is longer than a first sustainment time of the moving path P1, the resampling part may feedback a signal including the motion path P3 (e.g., new raw motion information) (S341) whereby the dividing step S31, the scaling step S32, and the merging step S33 are performed on the motion path P3 again. On the contrary, when the third sustainment time of the moving route P3 is equal to or shorter than the first sustainment time of the moving route P1, the motion information processing module may output motion information including the motion path P3 as a final motion path P (S342).

Here, when the third sustainment time of the motion path P3 is shorter than the first sustainment time of the moving path P1, the motion information processing module 11 may be configured to increase a period of a timing signal (i.e., extending the sustainment time of the final motion path 3) so that the control signal for the final motion path P is outputted for the first sustainment time other than the third sustainment time, or to stop its operation for a time difference compared to the first sustainment time, before a start of the operation of the motion apparatus according to the motion path P3 or after a completion of it.

Figure 4:
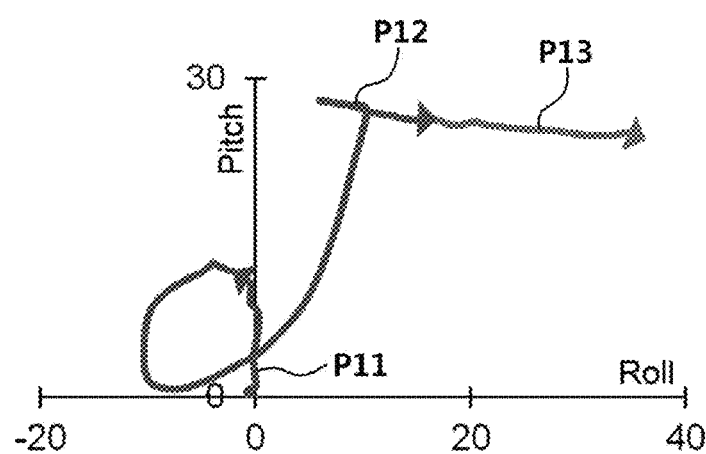
FIG. 4 is a conceptual diagram of raw motion information according to a comparative example.
Figure 5:
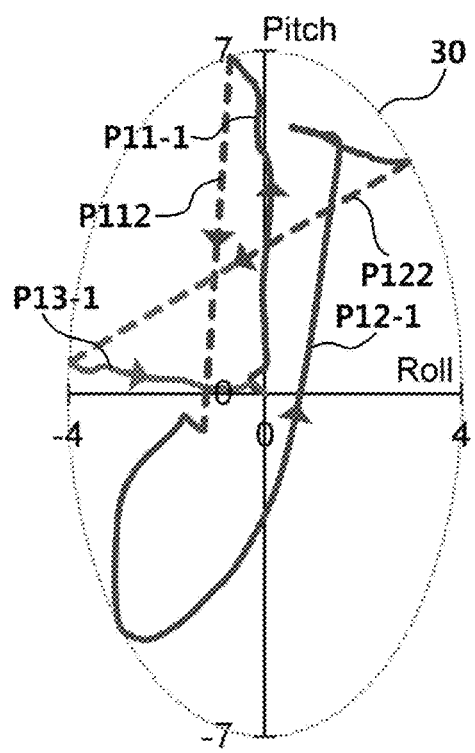
FIG. 5 is a conceptual diagram of motion information processed in the motion information processing module of FIG. 2.

FIG. 4 is a conceptual diagram of raw motion information according to a comparative example, and FIG. 5 is a conceptual diagram of motion information processed in the motion information processing module of FIG. 2.

Referring to FIG. 4, the raw motion information of the comparative example includes a moving path which is not yet processed by the motion effect generation apparatus according to the present disclosure. That is, the moving path included in the raw motion information has a pitch range of about 30 degrees (0 to 30) and a roll range of about 50 degrees (−10 to 40).

Meanwhile, in a case that the maximum motion range of the motion apparatus comprises a pitch range of 14 degrees and a roll range of 8 degrees, if the moving path of the comparative example is used to drive the motion apparatus without modification, the motion apparatus cannot output motion effect for parts of the moving path locating outside of the maximum motion range. Thus, in order to generate motion effects for the raw motion information having the moving path as shown in FIG. 4, it is necessary that a professional producer adjusts the raw motion information, and so it becomes impossible to apply such the motion information to the motion apparatus in real time.

On the other hand, the motion information processing module according to the present disclosure can transform the moving path included in the raw motion information into an optimal motion path suitable to the motion apparatus having the pitch range of 14 degrees and the roll range of 8 degrees. Also, even in a case that the raw motion information is inputted in real time, the motion information processing module can drive the motion apparatus by using the motion information transformed in real time from the raw motion information.

That is, as illustrated in FIG. 5, the motion path included in the motion information processed by the motion information processing module may be a motion path generated by scaling a plurality of divided segments and merging them.

In the present exemplary embodiment, the generated motion path may include a first segment P11-1, a second segment P12-1, and a third segment P13-1. Each of the segments P11-1, P12-1, and P13-1 may correspond to each of the segments P11, P12, and P13 of the comparative example of FIG. 4.

Also, in the present exemplary embodiment, the moving path may be processed by cutting parts of the moving path going out from a sphere 30 determined according to the maximum motion range of the motion apparatus, and moving the cut parts into the range of the sphere in parallel. Here, the sphere 30 may have an ellipse cross-section comprising a roll range from −4 to 4 and a pitch range from −7 to 7.

For example, in the merging, parts of the moving path which go out from the range of the sphere may be cut, the cut parts may be inserted inside of the sphere, being scaled to have proper sizes, so that end points, start points, or middle curving parts of the cut parts are faced to or inscribed in the sphere. In this instance, the segments may be merged by using additional segments P112 and P122, and their end point and start point may be connected to a center position of the sphere corresponding to a center point (0, 0) of a Cartesian coordinate system represented in roll and pitch.

Also, in the exemplary embodiment, the merged motion path may include a fourth segment P112 between the first segment P11-1 and the second segment P12-1, and a fifth segment P122 between the second segment P12-1 and the third segment P13-1. The additional segments P112 and P122 may fill breaks generated by the scaling and merging procedure between the segments so that smooth motion effect can be generated.

Figure 6:
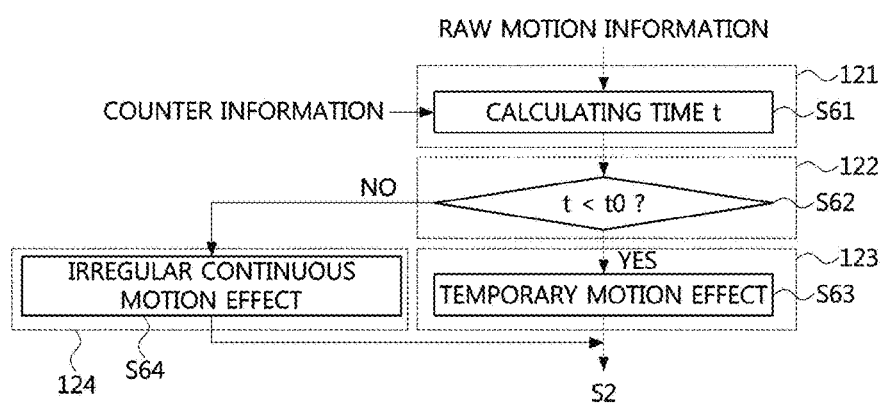
FIG. 6 is a flow chart illustrating an operation procedure of the event information processing module of FIG. 1.

FIG. 6 is a flow chart illustrating an operation procedure of the event information processing module of FIG. 1.

Referring to FIG. 6, the event information processing module (refer to 12 of FIG. 1) of the motion effect generation apparatus 10 according to an exemplary embodiment of the present disclosure may process a first event information having a shorter sustainment time than a predetermined reference time and a second event information having a sustainment time equal to or longer than the reference time, selectively or in parallel.

For this, the event information processing module may comprise a sustainment time calculation part 121, a comparison part 122, a temporary motion effect generation part 123, and an irregular continuous motion effect generation part 124. The operation procedures of respective components of the event information processing module are explained as follows.

Upon receiving the raw motion information (input signal), the sustainment time calculation part 121 may calculate the sustainment time t of event information included in the input signal (S61).

The sustainment time may be calculated by using a counter included in the processor (e.g., refer to 10p of FIG. 1). That is, the counter may be means for counting synchronization clocks supplied to the event information processing module, or a constituent part performing the function corresponding to that of the means. The counter may start a counting of synchronization clocks according to detection of the event information, and stop the counting at the completion of the event information.

Then, the comparison part 122 may determine whether the sustainment time t of the detected event information is shorter than the predetermined reference time t0 (S62).

In the step S62, the first event information having the sustainment time shorter than t0 may be discriminated from the second event information having the sustainment time equal to or longer than t0. For example, t0 may be 0.1 second. Also, the step 62 may be performed by discriminating the second event information having the sustainment time equal to or longer than t0 from the first event information.

Then, when t is shorter than t0, the temporary motion effect generation part 123 may generate a temporary motion effect (S63). The temporary motion effect may be generated by using a signal or control information S2 for driving the motion apparatus or the driving apparatus of the motion apparatus. For example, the signal for the temporary motion effect may include a signal for controlling the motion apparatus (e.g., a motion chair) to rapidly incline toward the direction of roll or pitch from an original state and return to the original state.

Meanwhile, when t is equal to or longer than t0, the irregular continuous motion effect generation part 124 may generate a random motion effect based on the event information (S64). For example, the irregular continuous motion effect generation part 124 may be means for generating and outputting Perlin noises according to the event information, or a constituent part performing that of the means.

In an exemplary embodiment, the event information processing module may be implemented as a single module. However, according to various exemplary embodiments, the event information processing module may be implemented as including separate modules such as a module for processing the first event information and a module for processing the second event information.

Also, according to various exemplary embodiment, the event information processing module may be a pre-processing module connected to the input end of the above-described motion information processing module, and be configured to detect event information having a sustainment time shorter than the reference time among inputted signals.

Figure 7:
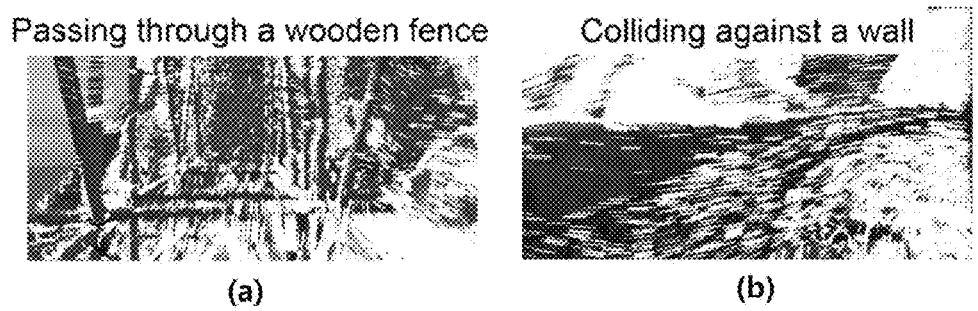
FIG. 7 is a conceptual diagram to explain event information of a video which can be used in an exemplary embodiment of the present disclosure.
Figure 8:
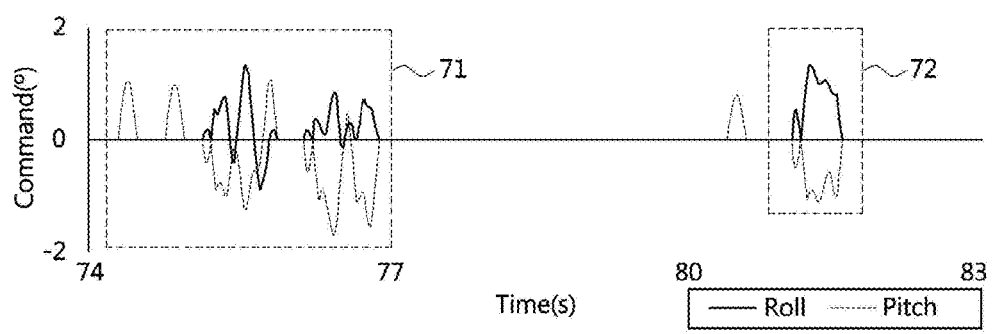
FIG. 8 is a graph illustrating random signals according to Perlin noise extracted as motion effects from the event information of FIG. 7.

FIG. 7 is a conceptual diagram to explain event information of a video which can be used in an exemplary embodiment of the present disclosure, and FIG. 8 is a graph illustrating random signals according to Perlin noise extracted as motion effects from the event information of FIG. 7.

The event information as illustrated in FIG. 8 may be obtained from a video (a) 'passing through a wooden fence' and a vide (b) 'colliding against a wall'. That is, a first motion effect of a first segment 71 in FIG. 8 is obtained from the video (a) through the motion effect generation method, and a second motion effect of a second segment 72 in FIG. 8 is obtained from the video (b) through the motion effect generation method.

That is, when the event (i.e. motion information) having a sustainment time longer than the reference time t0 is detected, the motion effect generation apparatus may generate random noises based on Perlin noise according to the detected event information, and output motion effect information including the generated noises as the first motion effect and the second motion effect. Here, each of the first motion effect and the second motion effect may have irregular wave forms whose sizes are varied randomly in time axis.

Figure 9:
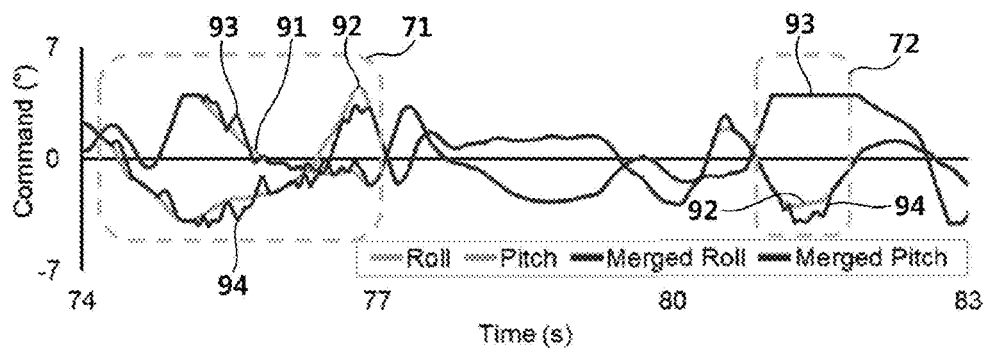
FIG. 9 illustrates a final motion effect generated by augmenting an event motion effect on a basic motion effect obtained from a motion effect generation apparatus.

FIG. 9 illustrates the result of motion effects generated by augmenting the motion effect (hereinafter, 'event motion effect') which is described in FIG. 8 on basic motion effect to which Perlin noises are not applied (hereinafter, 'basic motion effect') or obtained from a conventional arbitrary motion effect generation apparatus. Here, the basic motion effect may be a motion effect generated according to control information outputted by the motion information processing module.

In the graph of FIG. 9, each of lines 91 and 92 indicates a value of roll and a value of pitch for the basic motion effect, and each of lines 93 and 94 indicates a value of roll and a value of pitch for the final motion effect in which the event motion effect is merged to the basic motion effect.

According to the above exemplary embodiment, the motion effect generation apparatus may output the final motion effect generated by augmenting the event motion effect to which Perlin noise is applied on the basic motion effect. That is, the motion effect generation apparatus according to the present disclosure may generate dynamic motion effects to which realistic shocks according to the events are applied as compared to the basic motion effect.

While the exemplary embodiments of the present invention and their advantages have been described in detail, it should be understood that various changes, substitutions and alterations may be made herein without departing from the scope of the invention.

What is claimed is:

1. An apparatus for generating a motion effect, the apparatus comprising:
   at least one processor; and
   a memory storing instructions configured to instruct the at least one processor to perform:
   dividing a moving path of a camera or an object obtained from raw motion information into a plurality of segments;
   adjusting a size of each of the plurality of segments according to a driving range of a motion apparatus; and
   generating a motion path of the motion apparatus by merging the plurality of segments sizes of which are adjusted;
   wherein the generating a motion path comprises concatenating segments which are temporally adjacent among the plurality of segments, and connecting an end point and a start point of the concatenated segments to a center position or a reference position of the motion range of the motion apparatus.

2. The apparatus according to claim 1, wherein the raw motion information includes velocity change information or acceleration change information, and
   wherein the dividing a moving path comprises transforming the velocity change information or the acceleration change information into time-dependent position change information.

3. The apparatus according to claim 1, wherein the adjusting a size of each of the plurality of segment comprises computing a sphere having a minimum size including the plurality of segments, and scaling each of the plurality of segments in reference to the sphere according to the motion range of the motion apparatus.

4. The apparatus according to claim 3, wherein the adjusting a size of each of the plurality of segments comprises cutting parts of the plurality of segments locating outside of the sphere, and moving the cut parts into the sphere in parallel.

5. The apparatus according to claim 1, wherein the concatenating segments comprises generating an additional motion effect when a break exists between the segments which are temporally adjacent.

6. The apparatus according to claim 5, wherein the generating an additional motion effect comprises generating the additional motion effect connecting an end point of a first segment to a start point of a second segment with a straight line, wherein the first segment and the second segment are temporally adjacent, the break exists between the first segment and the second segment, and the first segment precedes the second segments.

7. The apparatus according to claim 1, wherein the instructions are configured to instruct the at least one processor to further perform:
   resampling the motion path of the motion apparatus as the first motion information, when a sustainment time of the motion path of the motion apparatus is longer than a sustainment time of the moving path of the camera or the object.

* * * * *